United States Patent
Falk et al.

(10) Patent No.: US 8,682,514 B2
(45) Date of Patent: Mar. 25, 2014

(54) CONTROL NETWORK FOR A RAIL VEHICLE

(75) Inventors: Rainer Falk, Poing (DE); Steffen Fries, Baldham (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/808,500

(22) PCT Filed: Jun. 15, 2011

(86) PCT No.: PCT/EP2011/059933
§ 371 (c)(1),
(2), (4) Date: Jan. 4, 2013

(87) PCT Pub. No.: WO2012/004098
PCT Pub. Date: Jan. 12, 2012

(65) Prior Publication Data
US 2013/0110328 A1    May 2, 2013

(30) Foreign Application Priority Data

Jul. 8, 2010   (DE) .......................... 10 2010 026 433

(51) Int. Cl.
*G05D 1/00*   (2006.01)
(52) U.S. Cl.
USPC ......................................................... 701/19
(58) Field of Classification Search
USPC ......................................................... 701/19
See application file for complete search history.

(56) References Cited

U.S. PATENT DOCUMENTS

| 5,920,543 A | 7/1999 | Saito | |
|---|---|---|---|
| 2008/0069673 A1* | 3/2008 | Tsujihama | 414/353 |
| 2011/0237242 A1* | 9/2011 | Gavrilovich | 455/422.1 |
| 2013/0252672 A1* | 9/2013 | Gavrilovich | 455/562.1 |

FOREIGN PATENT DOCUMENTS

| DE | 2 606 047 | | 9/1976 |
|---|---|---|---|
| EP | 1 719 688 | A1 | 11/2006 |
| EP | 1 886 893 | A1 | 2/2008 |
| GB | 2 450 520 | A | 12/2008 |

OTHER PUBLICATIONS

Siemens, "Sibas PN Einbindung von Subsystemen an PROFINET", Mar. 2007, pp. 1-119, Erlangen, Germany.

* cited by examiner

*Primary Examiner* — Hussein A. Elchanti
(74) *Attorney, Agent, or Firm* — Laurence A. Greenberg; Werner H. Stemer; Ralph E. Locher

(57) ABSTRACT

In a control network for a rail vehicle, control units of the rail vehicle are connected to each other in a ring shape via at least two communication paths. A first control unit transmits user data via a communication path in a first direction to a second control unit and test data associated with the user data for checking the user data via another communication path in a second direction opposite to the first direction to the second control unit. The second control unit can thus detect manipulation of data by a third party.

16 Claims, 7 Drawing Sheets

CONTROL NETWORK FOR A RAIL VEHICLE

BACKGROUND OF THE INVENTION

Field of the Invention

The invention relates to a control network for a rail vehicle and a method for transmitting data in a manipulation-proof manner between control devices of a rail vehicle, in particular of a train.

Rail vehicles have a plurality of control devices for activating devices, for example brake facilities, drive facilities, lighting facilities, door closing facilities and air conditioning systems. The control devices can also control passenger information units or seat reservation facilities for passengers. Passenger information facilities inform passengers for example of the options for changing to other trains, for example by means of acoustic announcements or optical displays. Control devices can also obtain data from video monitoring facilities, which is transmitted to the train driver for example. Control devices of a rail vehicle exchange user data with one another. Such user data can comprise passenger information data or device control data.

Control devices of rail vehicles are increasingly linked to one another by way of data networks using standard protocols, such as Ethernet or IP. The control devices are frequently accommodated in a region within a car or pulling unit of the rail vehicle that is physically difficult to access for third parties. In contrast the data communication network, by way of which the control devices transmit user data to other control devices, extends over segments of the rail vehicle that cannot be protected physically or can only be protected with difficulty. Such data communication networks are also set up in particular in the passenger region of the rail vehicle and can therefore be accessed relatively easily by third parties. The third party is therefore able in principle to tap into a line of the data communication network to carry out manipulations, for example to infiltrate data packets by way of the data communication network or to intercept a data transmission.

BRIEF SUMMARY OF THE INVENTION

One object of the present invention is therefore to create a control network and a method for rail vehicles, which allow manipulations at the cabling of the data communication network of the rail vehicle to be detected.

According to the invention this object is achieved by a control network having the features set out in claim 1.

The invention creates a control network for a rail vehicle, in which control devices of the rail vehicle are connected to one another in a ring shape by way of at least two communication paths, wherein a first control device transmits user data by way of a communication path in a first direction to a second control device and transmits test data associated with the user data for verifying the user data by way of another communication path in a second direction counter to the first direction to the second control device.

In one embodiment of the inventive control network the test data is sent from the first control device at regular time intervals or when an operating state of the rail vehicle changes.

In one embodiment of the inventive control network the user data is passenger information data.

In a further possible embodiment of the inventive control network the transmitted user data is device control data.

In one embodiment of the inventive control network the user data is transmitted in data packets by way of a data network with ring topology between the control devices of the rail vehicle.

In one embodiment of the inventive control network said data network is an Ethernet data network, in particular a Profinet.

In one embodiment of the inventive control network the data network is an electrical data network with ring topology, which is set up in a car of the rail vehicle.

In an alternative embodiment of the inventive control network the data network is an optical data network with ring topology, which is set up in a car of the rail vehicle.

In one embodiment of the inventive control network at least one monitoring facility is provided in the data network with ring topology, to monitor the closed nature of the ring topology, with the test data and the user data being transmitted from the first control device to the second control device by way of a remaining communication path when the ring topology has been broken.

In one possible embodiment of the inventive control network the second control device initiates countermeasures if the verification of the user data received by the second control device based on the test data received by the second control device shows that the user data does not originate from the first control device.

In one possible embodiment of the inventive control network the countermeasures comprise the second control device sending an alarm message to at least one further control device.

In a further possible embodiment of the inventive control network the countermeasures comprise the activation of a restricted operating mode by the second control device.

In one possible embodiment of the inventive control network the data network of a car of the rail vehicle is connected by way of a higher order data network of the rail vehicle to further data networks of further cars or of a pulling unit of the rail vehicle for data transmission between the control devices of the rail vehicle.

In one possible embodiment of the inventive control network the higher order data network is a rail vehicle data bus.

In a further alternative embodiment of the inventive control network the higher order data network is a rail vehicle data network that has a ring topology itself.

In one possible embodiment of the inventive control network the data network of a car of the rail vehicle is connected by way of electrically conductive rails to further data networks of further cars or of a pulling unit of the rail vehicle for data transmission between the control devices of the rail vehicle.

In a further possible embodiment of the inventive control network the data network of a car of the rail vehicle is connected by way of WLAN radio modules to further data networks of further cars or of a pulling unit of the rail vehicle for data transmission between control devices of the rail vehicle.

In a further possible embodiment of the inventive control network the data network of a car of the rail vehicle is connected by way of voltage supply lines for supplying voltage to the rail vehicle to further data networks of further cars or of a pulling unit of the rail vehicle for data transmission between control devices of the rail vehicle.

In one possible embodiment of the inventive control network the test data provided to verify the user data comprises checksums of the user data.

In a further possible embodiment of the inventive control network the test data provided to verify the user data comprises cryptographic keys for decrypting or verifying a cryptographically encrypted or cryptographically protected checksum of the user data.

In a further possible embodiment of the inventive control network the test data provided to verify the user data comprises parameters for setting up a cryptographic key.

In a further possible embodiment of the inventive control network the test data provided to verify the user data comprises data packet management data or header data of the data packets, in which the user data is transmitted.

In one possible embodiment of the inventive control network the test data provided to verify the user data comprises hash values.

In one possible embodiment the hash values are hash values of the user data.

In a further possible embodiment the hash values are hash values of the data packet management data.

In a further possible embodiment the hash values are hash values of the overall data packet including user data and data packet management data.

The invention also creates a method for transmitting data in a manipulation-proof manner between control devices of a rail vehicle, which are connected to one another in a ring shape by way of two communication paths, wherein a first control device transmits user data by way of a communication path in a first direction to a second control device and transmits test data associated with the user data for verifying the user data by way of another communication path in a second direction counter to the first direction to the second control device.

Possible embodiments of the inventive control network and of the inventive method for transmitting data in a manipulation-proof manner between control devices of a rail vehicle are described in the following with reference to the accompanying figures, in which:

DESCRIPTION OF THE INVENTION

Figure 1:
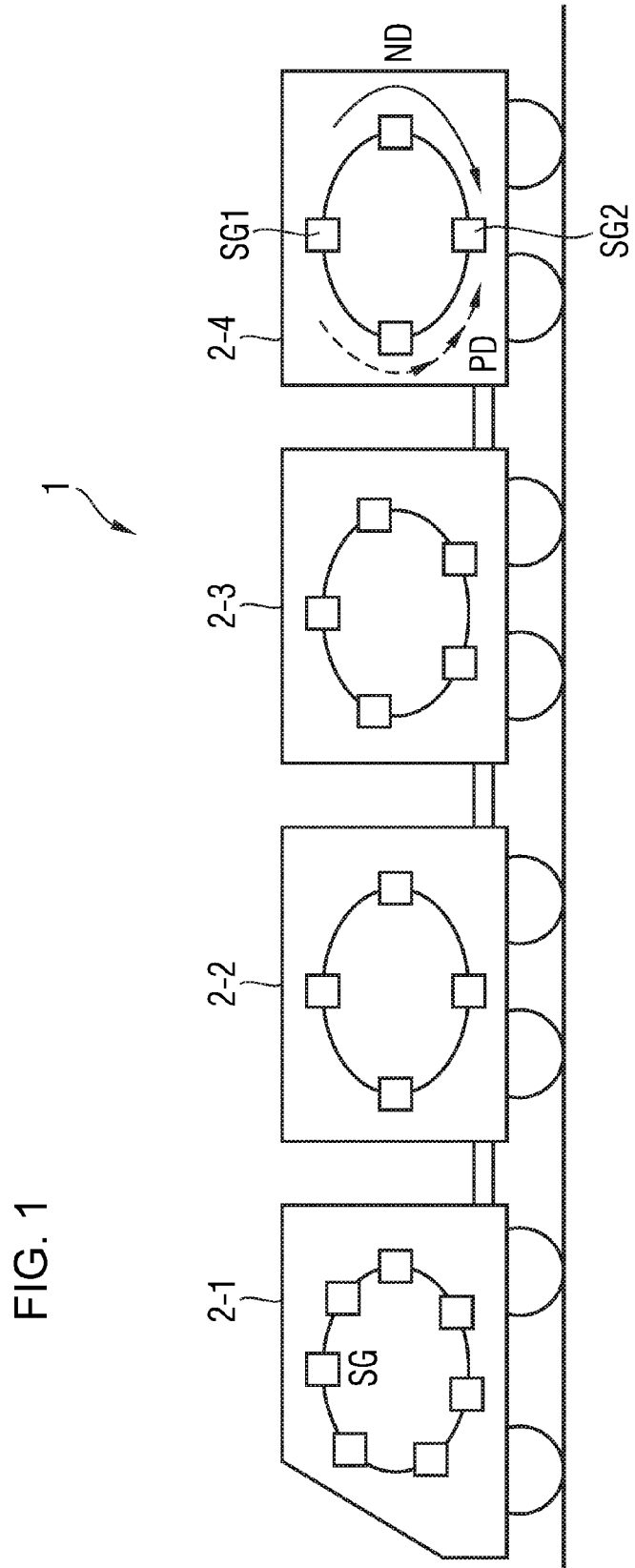
FIG. 1 shows a diagram to illustrate an exemplary embodiment of the control network for a rail vehicle with a number of ring-shaped data networks, which are provided in different cars or carriages of the rail vehicle.

FIG. 1 shows an exemplary embodiment of the inventive control network 1. The control network 1 is located in a rail vehicle, which moves on rails, for example a train. In the example illustrated in FIG. 1 this train comprises a pulling unit 2-1 and three cars or carriages 2-2, 2-3, 2-4 coupled thereto. The different cars of the rail vehicle can be coupled mechanically to one another, as illustrated in FIG. 1. Each car of the rail vehicle has control devices SG, which are connected to one another in a ring shape by way of a data network with ring topology. These control devices SG can be for example control devices of a brake system, a drive system, an air conditioning system, a lighting system, a door closing system, which communicate or exchange data with one another by way of a data network with ring topology. The data here is preferably transmitted as user data in data packets in the respective data network. These data packets comprise data packet management data as well as user data. User data can comprise control data for activating control devices SG, for example brake or drive facilities, as well as information data, for example passenger information data or seat reservation data. The user data can also include sensor data from sensors connected to the control devices SG. The data networks with ring topology set up in the different cars 2-$i$ of the rail vehicle can each be an electrical data network with ring topology or an optical network with ring topology. The control devices SG, which are connected to one another in a ring shape, can be connected by way of one or more lines. The lines comprise for example electric cables. Alternatively the lines can also be formed by optical waveguides or glass fibers. In one possible embodiment the ring-shaped data network is an Ethernet data network, which transmits data packets in real time, for example a Profinet.

In the inventive control network a first control device SG1 transmits user data ND by way of a communication path in a first direction to at least one second control device SG2 and at the same time or with a time delay transmits test data PD associated with the respective user data ND for verifying the user data by way of another communication path in a second direction counter to the first direction to the second control device SG2. When the user data ND and the test data PD are transmitted with a time delay, the test data PD can be transmitted both before and after the user data.

In the example illustrated in FIG. 1 a first control device SG1 in the last car 2-4 of the rail vehicle transmits user data ND to a second control device SG2 in a first direction by way of the respective ring and at the same time transmits associated test data PD for verifying the user data ND by way of another communication path in a second direction counter to the first direction. In the example illustrated in FIG. 1 the user data ND is transmitted or transported clockwise by way of the illustrated ring from the first control device SG1 to the second control device SG2 and the associated test data PD is transmitted counterclockwise to the same control device SG2. In one possible embodiment the transmission of the test data PD from the first control device SG1 to the second control device SG2 can take place at regular time intervals, e.g. once per minute, once per hour or once per day. In an alternative embodiment the test data PD is sent from the first control device SG1 as required, in particular when an operating state of a unit of the rail vehicle changes, to the second control device SG2. The state change can occur for example due to activation of a control function in a control device SG, for example when a lighting facility or air conditioning facility is switched on or off. A state change can also be captured by means of sensors. For example a control device SG1 sends user data ND to a second control device SG2 when the rail vehicle starts up or when the rail vehicle switches to maintenance mode. In one possible embodiment the user data ND and the associated test data PD can be transmitted from the first control device SG1 to the second control device SG2 in real time.

In one possible embodiment at least one monitoring unit is provided in each data network with ring topology, to monitor the closed nature of the respective ring or of the ring topology. If the ring topology is broken, for example by a fire in the respective car 2-*i*, the test data PD and the user data ND can be transmitted from the first control device SG1 by way of the remaining communication path to the second control device. If, in the example illustrated in FIG. 1, the communication path, which operates clockwise between the two control devices SG in car 2-4, fails, this is detected by way of the monitoring unit of the data network of car 2-4. The different control devices $SG_i$ of the data network are then instructed by the monitoring unit to transmit both the user data ND and the associated test data PD counterclockwise in the relevant network. This has the advantage that when a data link between control devices SG is broken, for example due to a cable fire or other damage to the data connection, the relevant ring-shaped data network is still functional and transmits user data ND and associated test data PD reliably between the control devices SG.

The second control device SG2 performs a verification of the user data ND received by the second control device SG2 based on the test data PD received by the second control device SG2. If this verification shows that the user data ND obtained does not originate from the first control device SG1, in one preferred embodiment the second control device SG2 initiates corresponding countermeasures. For example the second control device SG2 sends an alarm message to at least one other control device, to give notification of the occurring error. Actuators can also be activated, for example a warning lamp in the pulling unit 2-1 of the rail vehicle. In one possible embodiment the rail vehicle is prompted to make an emergency stop. It is also possible in the event of an alarm message for a corresponding entry to be made in a log file or an error storage unit. In a further possible variant the second control device SG2 is switched to a restricted operating mode as a countermeasure. For example a switch is initiated in a fail-safe operating mode, in which there is no risk to drive mode of the rail vehicle from the relevant second control device SG2. In a further possible embodiment the second control device SG2 initiates a restricted drive mode of the rail vehicle. It is also possible for the relevant control device SG2 to reject individual received messages or only to accept and further process individual messages.

In one possible embodiment of the inventive control network 1 the test data PD used to verify the user data ND is formed by checksums of the user data ND. These can be CRC checksums or CBC-MAC values or HMAC values for example. The test data PD can in particular also comprise hash values of the user data ND or hash values of the headers or data packet management data of the transmitted data packets. Checksums of one or more transmitted user data messages or user data packets can be used for verification purposes.

In a further possible embodiment the test data PD used is cryptographic keys for decrypting a cryptographically encrypted checksum of the user data ND or for verifying a cryptographically protected checksum.

In a further possible embodiment of the inventive control network 1 data packet management data or header data of the transmitted data packets is used as test data PD. Such data packet management data comprises for example the MAC address of the receiving control device. It is also possible for the test data PD used to be an IP address of the sending and receiving control device. Port numbers or protocol IDs are also suitable for use as test data PD.

In a further possible embodiment of the inventive control network 1 the test data PD provided for verifying the user data ND is parameters for setting up or updating cryptographic keys. Data here can be exchanged in a key agreement protocol, e.g. IKE or IEEE 802.1af, by way of one communication path, while the user data is exchanged by way of the other communication path. It is also possible here to exchange a checksum of the parameters used in the key agreement protocol by way of the second communication path. It is also possible to transmit a first parameter for setting up or updating a cryptographic key by way of the first communication path and a second parameter by way of the second communication path and then to determine the cryptographic key based on the first and second parameters.

The second control device SG2 can detect, based on the security information or test data PD obtained, whether the received user data ND has been infiltrated or manipulated by a third party. It is thus possible with the inventive control network 1 to detect manipulations during data transmission. This allows the data transmission cables in the train to be set up with little or no protection, so the cabling outlay can be reduced without compromising on security. In some implementations only one part of the cabling can be set up with protection, e.g. in the underfloor region, while another part of the cabling is set up in a relatively easily accessible region, e.g. in the passenger region. With the inventive control network it is sufficient to accommodate the different control devices SG with physical protection in the respective car of the rail vehicle. With an inventive control network 1 an attacker, who only taps into or manipulates the ring-shaped data network at one point, has no access to the corresponding check information or test data, which is transmitted by way of the other communication path. Any manipulations performed can therefore be detected by the second control device SG2. With the inventive control network 1 it is possible to enhance data communication security significantly even without using complex cryptographic methods. With the inventive control network 1 and the inventive method it is possible, in particular when using asymmetrical security mechanisms based on public and corresponding private cryptographic keys, to allow the public keys to be verified by means of a key agreement protocol. This is particularly important in environments where certified key material is not used. When a symmetrical cryptographic key is used, it can be transmitted or agreed by way of one path and check information that is a function of the set up or agreed key, e.g. a checksum or a hash value, is transmitted by way of the second path in the counter direction.

The control devices SG, which are connected in a ring shape, preferably each have at least two network interfaces. The network interfaces can be assigned security functions, for example packet filters for filtering data packets, for encryption and checksum verification. The different control devices SG preferably have at least one data processing unit or a processor, which processes the received user data ND or forwards it to another control device SG. The received user data ND can be control data, which is interpreted by the processor as control commands. The processor can activate actuators of the respective control device SG as a function of the received control data. The test data PD or check information associated with the user data ND is preferably received by the receiving control device by way of another network interface. The transmitted user data can also contain configuration data for the different control devices SG.

Figure 2A:
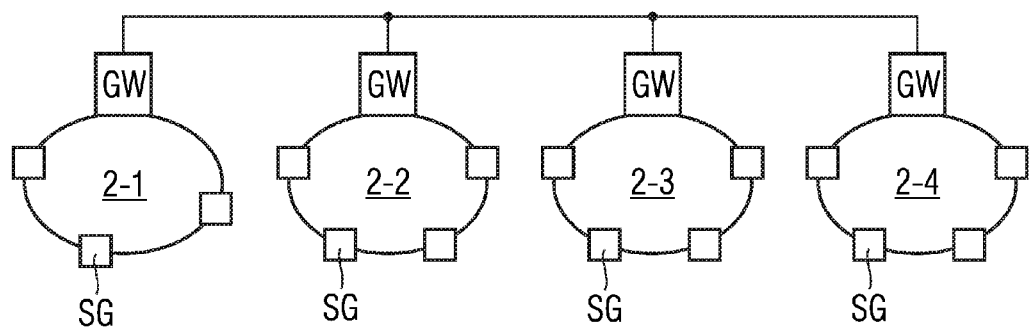
FIGS. 2A, 2B show diagrams to illustrate exemplary embodiments of the inventive control network for a rail vehicle.
Figure 2B:
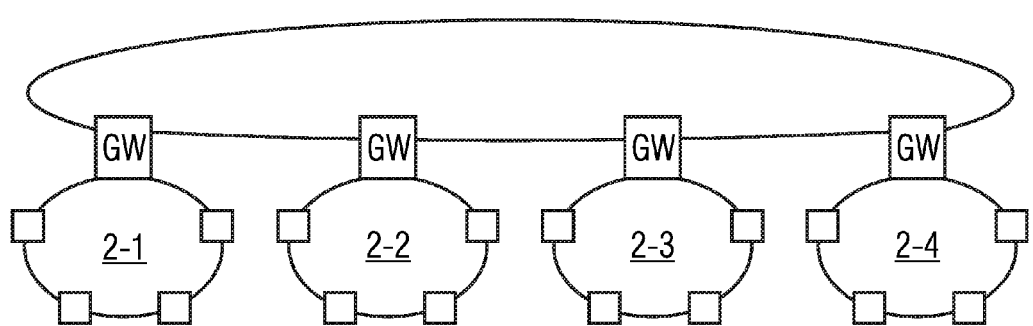

FIGS. 2A, 2B show different exemplary embodiments of the inventive control network 1. In the illustrated exemplary embodiments the different data networks of the rail vehicle cars are connected by way of a higher order data network of the rail vehicle to further data networks of further cars of the rail vehicle for data transmission between the control devices SG of the rail vehicle. The ring-shaped data networks set up in the pulling unit 2-1 and the cars 2-2, 2-3, 2-4 each comprise a number of control devices SG, each ring being connected by way of a gateway GW to further data networks of the rail vehicle. In the exemplary embodiment illustrated in FIG. 2A the higher order data network is formed by a rail vehicle data bus. In the exemplary embodiment illustrated in FIG. 2B the higher order data network of the rail vehicle is formed by a data network that also has a ring topology. In the exemplary embodiment illustrated in FIG. 2B the different gateways GW of the data networks set up in the different cars in turn form a data network with ring topology. In the example illustrated in FIG. 2A the different gateways GW are connected to one another by way of a data bus, which can be set up as a higher order data network, for example by way of the mechanical coupling facilities of the different rail vehicle cars.

Figure 3A:
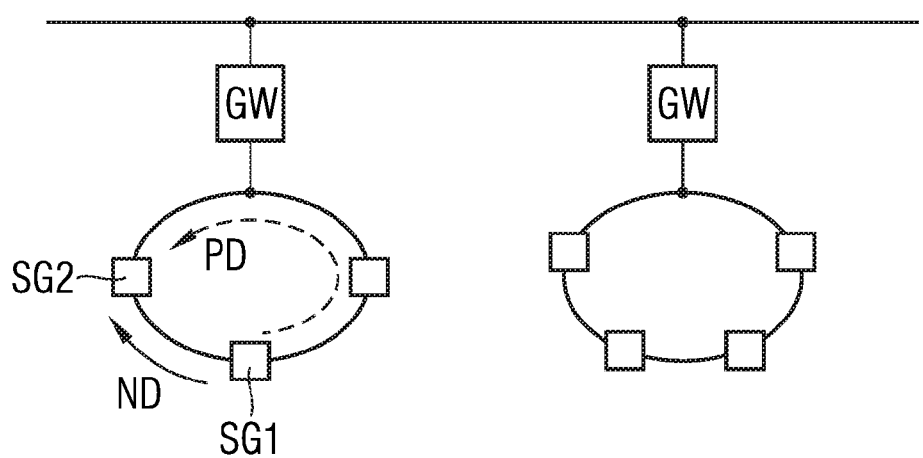
FIGS. 3A, 3B show diagrams to explain the mode of operation of the inventive control network.
Figure 3B:
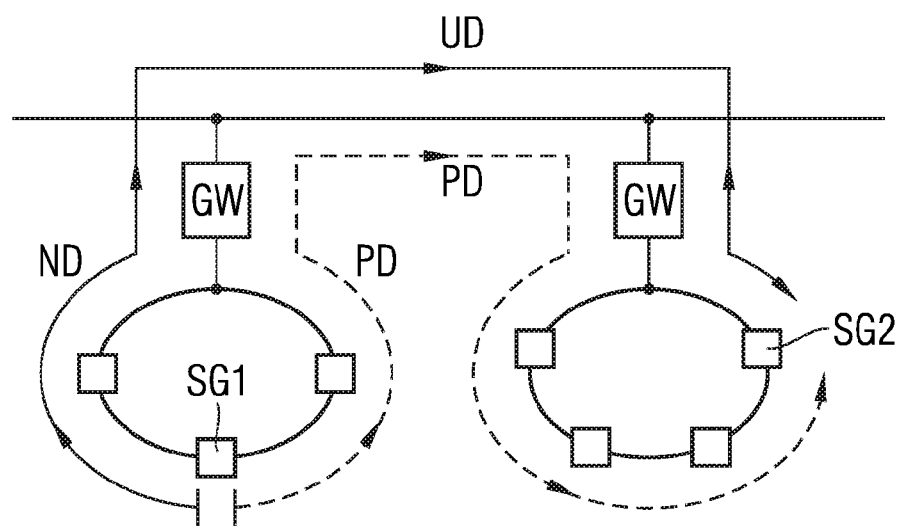

FIGS. 3A, 3B show diagrams to clarify the mode of operation of the inventive control network. In the example illustrated in FIG. 3A a first control device SG1 transmits user data to a second control device SG2 in the same ring. The test data PD associated with the user data ND is transmitted in the counter direction to the same control device SG2 and compared there with the received user data.

In the example illustrated in FIG. 3B a first control device SG1, which is located in a first ring-shaped data network, transmits data to a second control device SG2, which is located in a different second ring-shaped data network. The data transmission here takes place by way of the gateways and the higher order data network, which is a data bus in the illustrated exemplary embodiment. As shown in FIG. 3B the associated test data is transmitted to the second control device SG2 in the respective rings in the counter direction. In the higher order data bus the user data ND and test data PD are transmitted in the same direction. The test data PD and user data ND can be transmitted by way of different data lines of the common data bus. In an alternative embodiment the user data ND and the test data PD are transmitted in the same direction with a time delay by way of the data bus, in particular if the data bus only has a single line.

Figure 4:
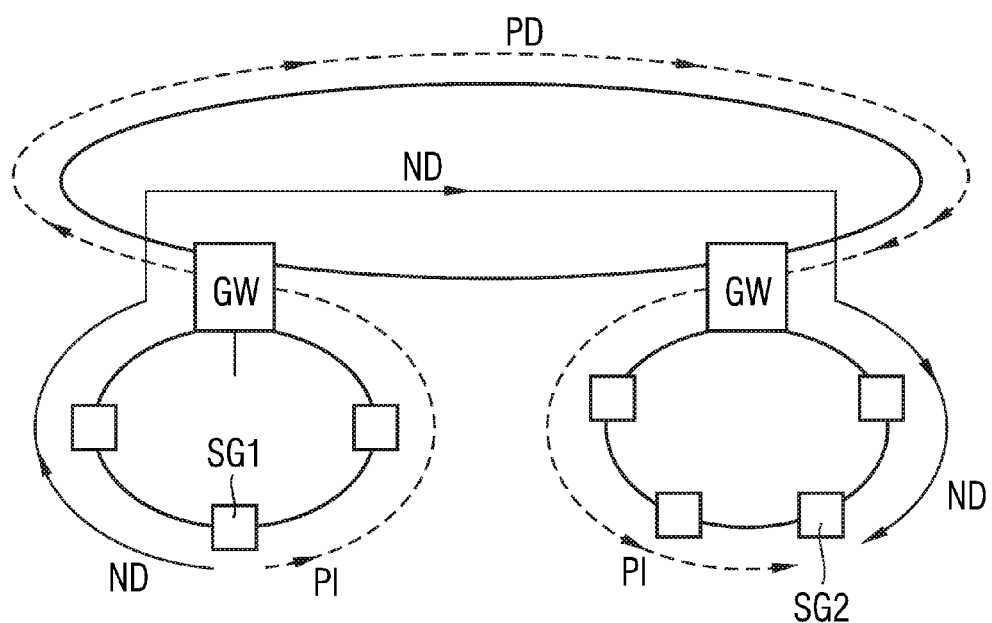
FIG. 4 shows a further diagram to illustrate the mode of operation of the inventive control network.

FIG. 4 shows a further diagram to illustrate the mode of operation of the inventive control network 1. In the example illustrated in FIG. 4 the higher order data network is also formed by a ring. In the illustrated example a control device SG1 in a first ring transmits user data ND by way of the ring-shaped higher order data network to a second control device SG2 located in a different ring-shaped network. The two ring-shaped data networks are located for example in different cars of a rail vehicle. As shown in FIG. 4, the user data ND is transmitted from the first control device SG1 in the ring-shaped data networks of the different cars in the counter direction to the second control device SG2. A counter transmission of user data ND and test data PD also takes place in the ring-shaped data network of the rail vehicle, in other words the higher order data network of the rail vehicle as a whole.

Figure 5:
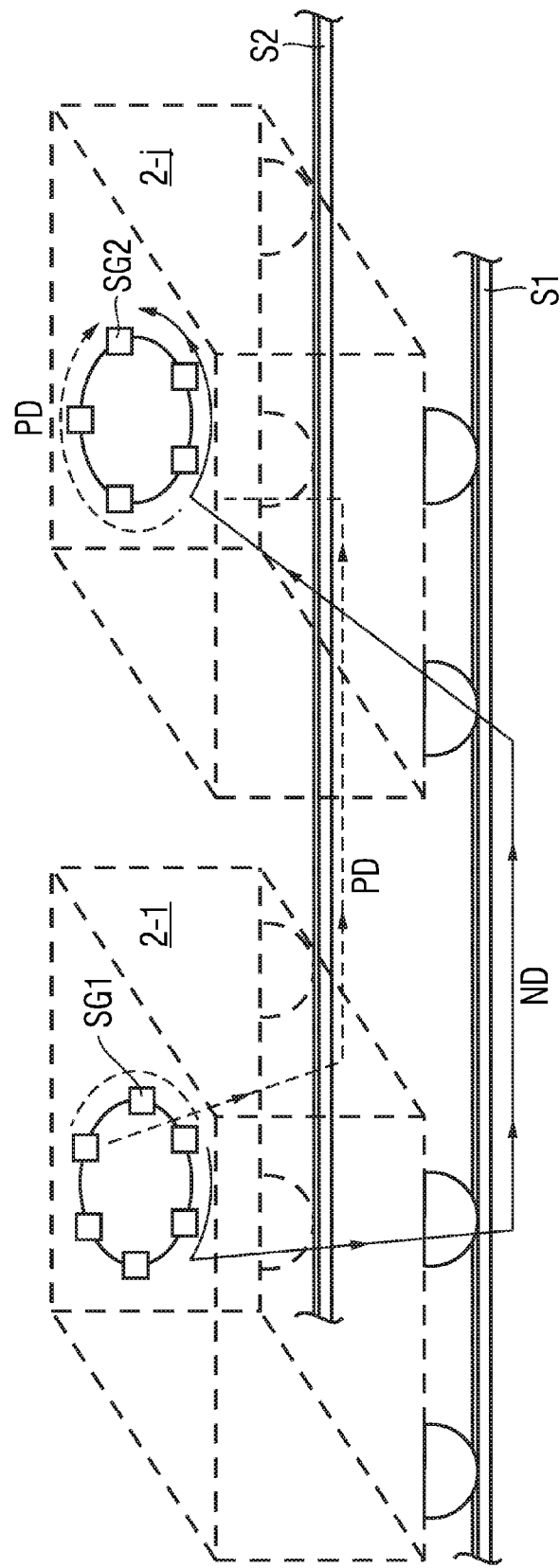
FIG. 5 shows a further diagram to illustrate a further exemplary embodiment of the inventive control network.

FIG. 5 shows a further exemplary embodiment of the inventive control network. In the exemplary embodiment illustrated in FIG. 5 a first control device SG1 in a first car 2-i first transmits user data ND to a further control device within the same ring, which has an electrical connection to a first rail S1. The user data ND is transmitted by way of the first rail S1 to another car 2-j and passes from a device of the second ring-shaped data network 2-j connected electrically to the rail wheels to the second control device SG2. The test data PD associated with the user data ND is transmitted from the first control device SG1 by way of a second rail S2 to the control device SG2 located in the other car 2-j in the counter direction. The rails S1, S2 are electrically conductive and are suitable for data transmission in the illustrated exemplary embodiment. The exemplary embodiment illustrated in FIG. 5 has the advantage that the two cars 2-i, 2-j do not have to be coupled mechanically to one another. The two cars 2-i, 2-j can also be cars of different rail vehicles. In one possible embodiment each of the two cars 2-i, 2-j forms an independent rail vehicle, for example for transporting passengers from an airport.

In one possible embodiment the second control device SG2 of the car 2-j, when it receives user data ND, in turn sends data back to the first control device SG1 of the other car 2-i. This allows user data ND and associated test data PD to be exchanged bidirectionally between the two cars 2-i, 2-j. In one possible embodiment the two control devices SG1, SG2 exchange position data as user data, for example to ensure a minimum distance between the two cars 2-i, 2-j. If for example the second control device SG2 determines from the received user data ND that the distance between the two cars 2-i, 2-j is less than the minimum, the second control device SG2 can prompt another control device in the car 2-j to slow down or accelerate the car 2-j.

Figure 6:
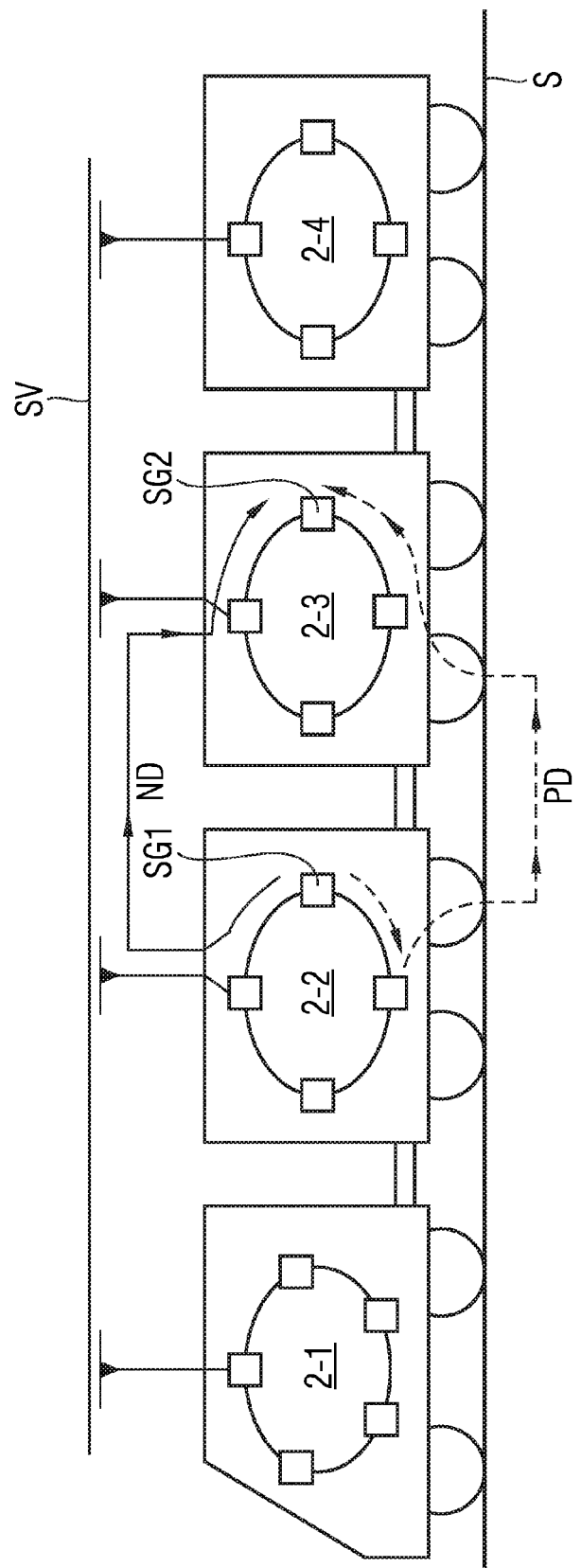
FIG. 6 shows a diagram to illustrate a further exemplary embodiment of the inventive control network.

FIG. 6 shows a further exemplary embodiment of the inventive control network 1. In the exemplary embodiment illustrated in FIG. 6 the first control device SG1 transmits user data to a second control device SG2 by way of a voltage supply line for supplying voltage to the rail vehicle. The associated test data PD is transmitted by way of an alternative communication path to the second control device SG2. In the example illustrated in FIG. 6 the test data PD is sent from the first control device SG1 by way of a rail S to the first car 2-2 from the second car 2-3, where it is picked up and forwarded to the second control device SG2. In the embodiment illustrated in FIG. 6 the mechanical coupling indicated there between the different cars 2-i of the rail vehicle is not absolutely necessary in order to allow data communication between different cars 2-i.

Figure 7:
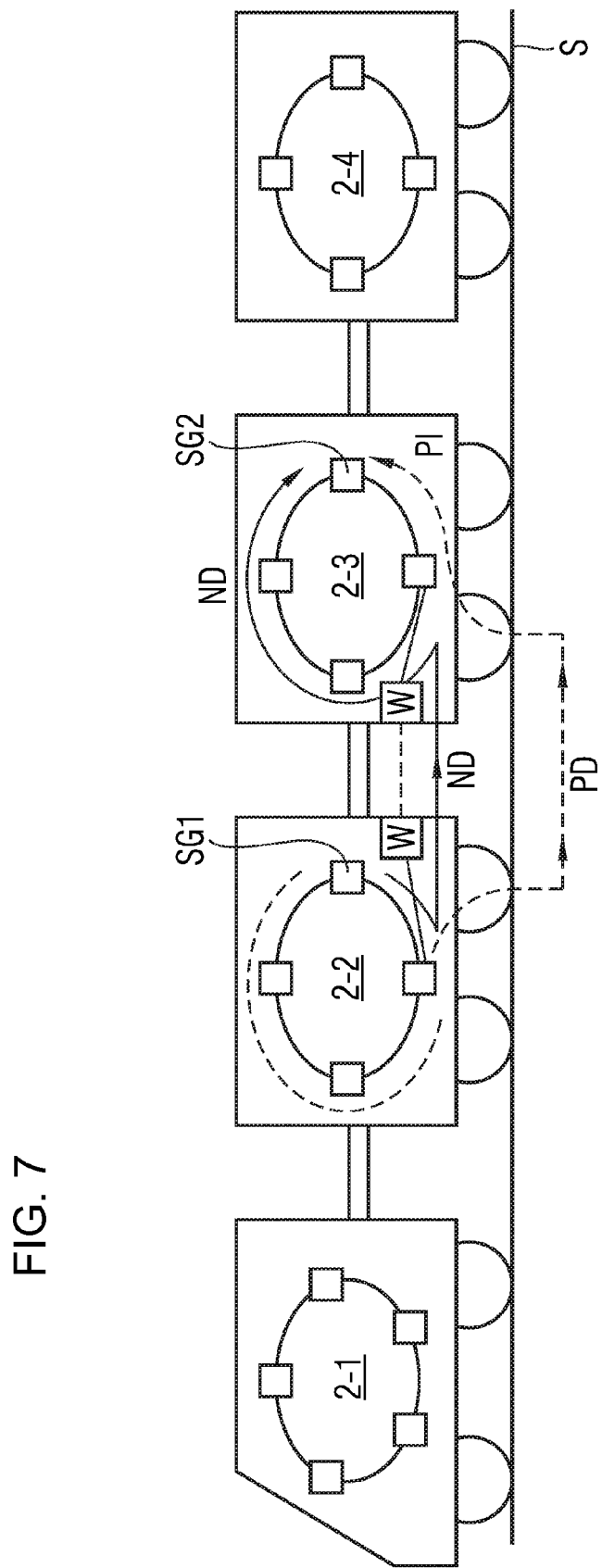
FIG. 7 shows a diagram to illustrate a further exemplary embodiment of the inventive control network

FIG. 7 shows a further exemplary embodiment of the inventive control network 1. In the exemplary embodiment illustrated in FIG. 7 a control device SG1 in the car 2-2 sends user data ND to a control device SG2 in the car 2-3 of the rail vehicle. The user data ND is transmitted with the aid of a WLAN radio module W from the second car 2-2 to the third car 2-3 by way of an air interface. The test data PD associated with the user data ND is transmitted by way of a rail S to the second control device SG2 in the example illustrated in FIG. 7.

Different combinations of the exemplary embodiments illustrated in FIGS. 5, 6, 7 are possible. To enhance manipulation protection the test data PD and further test data copies can travel on different communication paths from the first control device SG1 to the second control device SG2. For example the test data PD is not only transmitted as illustrated in FIG. 4 by way of an assigned ring-shaped data network of the rail vehicle in the counter direction to the user data ND to another car but also by way of an air interface or a rail or a voltage supply line. In this exemplary embodiment the second control device SG2 obtains the test data PD on different signal routes and can compare it. The user data ND can also be transmitted from the first control device SG1 to the second control device SG2 on a number of communication paths or transmission paths in possible embodiments. With the inventive control network 1 the signal paths or communication paths for the user data ND and the associated test data PD are selected such that the overlap between the two communication paths is as small as possible. Ideally the two communication paths have no overlap. The inventive control network utilizes the redundancy in different communication paths to enhance manipulation protection.

The invention claimed is:

1. A control network for a rail vehicle, comprising:
   at least two communication paths connecting control devices of the rail vehicle to one another in a ring shape;
   a first control device transmitting user data by way of a communication path in a first direction to a second control device; and
   the first control device transmitting test data associated with the user data for verifying the user data by way of another communication path in a second direction counter to the first direction to the second control device.

2. The control network according to claim 1, wherein the test data are sent from the first control device at regular time intervals or when an operating state of the rail vehicle changes.

3. The control network according to claim 1, wherein the user data comprise passenger information data and device control data.

4. The control network according to claim 1, wherein the user data are transmitted in data packets by way of a data network with ring topology between the control devices.

5. The control network according to claim 4, wherein the data network is an Ethernet data network.

6. The control network according to claim 5, wherein the data network is a Profinet network.

7. The control network according to claim 4, wherein the data network is an optical data network or an electrical data network with ring topology, disposed in a car of the rail vehicle.

8. The control network according to claim 7, wherein the data network with ring topology comprises a monitoring facility, to monitor a closed nature of the ring topology, with the test data and the user data being transmitted from the first control device to the second control device by way of a remaining communication path when the ring topology has been broken.

9. The control network according to claim 1, wherein the second control device is configured to initiate countermeasures if a verification of the user data received by the second control device based on the test data received by the second control device indicates that the user data does not originate from the first control device.

10. The control network according to claim 9, wherein the countermeasures comprise one or both of the following: sending an alarm message from the second control device to at least one further control device or activating a restricted operating mode by the second control device.

11. The control network according to claim 7, wherein the data network of a given car of the rail vehicle is connected by way of a higher order data network of the rail vehicle to further data networks of further cars or of a pulling unit for data transmission between the control devices of the rail vehicle.

12. The control network according to claim 11, wherein the higher order data network of the rail vehicle is a rail vehicle data bus or a rail vehicle data network with ring topology.

13. The control network according to claim 10, wherein the data network of a given car of the rail vehicle is connected to further data networks of further cars or of a pulling unit of the rail vehicle by way of electrically conductive rails, or by way of WLAN radio modules, or by way of voltage supply lines for supplying voltage to the rail vehicle for data transmission between the control devices of the rail vehicle.

14. The control network according to claim 1, wherein the test data provided to verify the user data comprise:
    checksums of the user data; or
    cryptographic keys for decrypting a cryptographically protected checksum of the user data; or
    parameters for setting up a cryptographic key; or
    data packet management data of data packets for transmitting the user data.

15. The control network according to claim 14, wherein the test data for verifying the user data comprise hash values of the user data or hash values of the data packet management data or hash values of the user data and of the data packet management data.

16. A method for transmitting data manipulation-proof between control devices of a rail vehicle, the control devices being connected to one another by way of at least two communication paths, the method which comprises:
    transmitting user data from a first control device by way of a communication path in a first direction to a second control device; and
    transmitting test data associated with the user data for verifying the user data from the first control device to the second control device by way of another communication path in a second direction counter to the first direction.

* * * * *